United States Patent [19]

Uehara et al.

[11] 4,368,476

[45] Jan. 11, 1983

[54] INK JET RECORDING HEAD

[75] Inventors: Haruo Uehara, Yokohama; Shigeyuki Matsumoto, Kawasaki; Yasushi Takatori, Sagamihara; Tokuya Ohta, Yokohama; Yohji Matsufuji, Tokyo, all of Japan

[73] Assignee: Canon Kabushiki Kaisha, Tokyo, Japan

[21] Appl. No.: 212,448

[22] Filed: Dec. 3, 1980

[30] Foreign Application Priority Data

Dec. 19, 1979 [JP] Japan ................................ 54-165437

[51] Int. Cl.$^3$ ................................ G01D 15/18

[52] U.S. Cl. ................................ 346/140 R; 346/75

[58] Field of Search ................................ 346/140 R, 75

[56] References Cited

U.S. PATENT DOCUMENTS 3,946,398 3/1976 Kyser ........................ 346/140 R X

OTHER PUBLICATIONS

Hildenbrand et al.; Preventing Clogging of Small Orifices in Objects Being Coated; IBM TDB, vol. 15, No. 9, Feb. 1973, p. 2899.

Barer, R. W.; Surface Treatment of Nozzles for Ink Jet Printers; IBM TDB, vol. 22, No. 5, Oct. 1979, pp. 1965–1966.

Balanson et al.; Low Energy Coating for Drop-On-Demand Silicon Nozzles; IBM TDB, vol. 23, No. 1, Jun. 1980, p. 294.

*Primary Examiner*—Joseph W. Hartary

*Attorney, Agent, or Firm*—Fitzpatrick, Cella, Harper & Scinto

[57] ABSTRACT

An ink jet recording head of the type in which ink droplets are jetted from the orifice of the head toward a recording material to effect recording on the surface of the recording material with said ink droplets, said recording head characterized in that at least the area surrounding the jet orifice is treated with a compound of general formula: $R.Si.X_3$ wherein, R is a fluorine containing group selected from fluoroalkyl, fluoroaryl, fluorocycloalkyl, fluoroalkaryl and fluoroalkylaryl, each having 1 to 20 carbon atoms, and the ratio in number of fluorines: other elements in said fluorine containing group being not less than 1:1, and X is halogen, a hydrolyzable group selected from alkoxy, alkyl and acyloxy each having 1 to 5 carbon atoms, or hyroxyl.

5 Claims, 7 Drawing Figures

INK JET RECORDING HEAD

BACKGROUND OF THE INVENTION

1. Field of the Invention

The present invention relates to a recording head for such type of ink jet recording apparatus in which a recording liquid as generally referred to as ink is jetted from an orifice, in a form of droplets, toward the surface of a recording material such as paper to effect printing on it. More particularly, the present invention is directed to improvements in the orifice portion of such ink jet recording head.

2. Description of the Prior Art

At present, various recording methods are known and used. Among others, ink jet recording method has particular advantages. This is a non-impact recording method according to which almost no noise is generated during recording operation. It enables high speed recording. In addition, recording can be accomplished on any common paper without need of particular fixing treatment. In view of these advantages many ink jet recording systems have been proposed and many attempts have been made to further improve them. Some of them have already been accepted in the market and some of them are still under development to put them to practical use.

In brief, ink jet recording method is a recording method wherein recording liquid, namely ink is jetted in a form of ink droplets flying toward a recording member such as paper on which the ink droplets are deposited to effect printing. Known ink jet recording processes are grouped into several types in accordance with the method used to generate recording ink droplets, the method used to control the flying course of the droplets and the like.

One typical type is generally called continuous type which is disclosed, for example, in U.S. Pat. Nos. 3,596,275 (Sweet Process) and 3,298,030 (Lewis and Brown Process). According to the continuous type of ink jet recording process, a stream of ink droplets charged with electric charge is generated while controlling the charge by a continuous oscillation generating method. The ink droplets with a controlled amount of electric charge are jetted toward a recording member. To control flying course of the ink droplets, there are disposed a pair of deflecting electrodes to which a uniform electric field is being applied. The ink droplets fly toward the recording member passing through between the deflecting electrodes.

Another typical type opposable to the above is that generally called on-demand type which is disclosed, for example, in U.S. Pat. No. 3,747,120 (Stemme Process). According to the ink jet recording method this type there is used a recording head having an orifice for jetting ink from it and piezo-oscillator mounted on the head. An electric recording signal is applied to the piezo-oscillator by which the electric signal is transformed into a mechanical oscillation of the piezo-oscillator. Every time when demand is made, ink droplets are jetted from the orifice toward a recording member in accordance with the mechanical oscillation of the piezo-oscillator.

An example of recording head commonly used in the known ink jet recording systems outlined in the above is shown in FIG. 1.

The recording head generally designated by 1 comprises a conduit pipe 2 made of suitable material such as glass, ceramics or metal and a piezo element 3 disposed around the the pipe 2. The conduit pipe 2 forms a part of the flow passage 6 for ink IK and has a fine hollow. The piezo element 3 constitutes means for jetting the ink filled in the pipe 2 from a jet orifice 4. The piezo element 2 should be considered as an example of such ink jetting means.

At one end of the conduit pipe 2 opposite to the orifice 4, the conduit pipe 2 is connected with a tube 5 made of, for example, polyvinyl chloride. The tube 5 forms another part of the flow passage for ink IK and extends to an ink tank not shown. Ink IK is supplied to the conduit pipe 2 from the ink tank through the tube 5 in the direction of arrow P.

In the recording head 1 having the above described structure, physical properties of the surface around the jet orifice 4 are of critical importance for obtaining a stable jet of ink IK from the orifice 4 constantly.

In the shown example, the orifice 4 is formed by one end portion of the conduit pipe 2 integrally with the pipe. However, the orifice may be formed by a separate orifice plate having an opening of predetermined diameter fixed to the end portion of the pipe 2. In either case, there arise difficult problems in jetting ink from the orifice. In use of the recording head 1 the ink IK sometimes flows into the area of the outer surface around the orifice 4 and forms a pool of ink there. If once formed, such a pool of ink disturbs the stability of jet of ink from the orifice. The flying course of ink droplets jetted from the orifice is made deviated from the determined regular direction by it. Furthermore, the flying direction of ink droplets varies every time of ink jet. It is no longer possible to obtain a stable jet of droplets. Therefore, no good recording can be assured. If the whole surface area surrounding the orifice 4 is covered with a film of ink IK, then there occurs so-called splash phenomenon by which the ink is scattered, which also prevents stable recording. In the worst case, the jet of ink droplets from the orifice gets blocked with the growth of such pool of ink around the orifice.

To solve the above problem it has been already proposed to treat the outer surface of the recording head surrounding the jet orifice with silicone oil or the like to render the surface water repellent. For example, reference is made to Japanese Utility Model Application Publication No. 36,188/1973. However, known agent for above treatment is poor in adhesive property to glass, metal or other material by which the orifice is formed. Therefore, it lacks durability and the desired effect of the treatment is obtainable only for a short time after the treatment. Moreover, the treatment agent possesses not only fluidity but also solubility to the solvent commonly used in the recording ink composition. Due to these properties, the treating agent is washed away by the recording ink and therefore its effect can not last long. The treating agent frequently mixes in the recording ink and results in change in composition of the ink which may have adverse effects on the performance of the ink jet recording.

Another disadvantage of the known treating agents are found in their unsatisfactory liquid repellency. For example, silicone system treating agent has an adequate repellency to aqueous system inks. But, it exhibits no repellency to organic solvent system inks such those of alcohol system, ketone system and ester system.

SUMMARY OF THE INVENTION

Accordingly, it is a general object of the invention to solve the problems involved in the prior art mentioned above.

It is a more specific object of the invention to provide an ink jet recording head which enables the ink to jet in a stable manner in respect of direction and amount of the jet of ink and which is adaptable for high speed recording.

It is another object of the invention to provide an ink jet recording head provided with a liquid repellent film layer which exhibits very high repellency not only to aqueous ink but also non-aqueous ink and is so strongly bonded to the jet orifice forming member that permanently durable liquid repellency can be assured.

According to the present invention, there is provided an ink jet recording head of the type in which ink droplets are jetted from the jet orifice of the head toward a recording material to effect recording on the surface of the recording material with said ink droplets, characterized in that at least the area surrounding the jet orifice is treated with a compound of general formula:

$$R.Si.X_3$$

wherein, R is a fluorine containing group selected from fluoroalkyl, fluoroaryl, fluorocycloalkyl, fluoroalkaryl and fluoroalkylaryl, each having 1 to 20 carbon atoms, and the ratio in number of fluorines:other elements in said fluorine containing group being not less than 1:1; and X is halogen, a hydrolyzable group selected from alkoxy, alkyl and acyloxy each having 1 to 5 carbon atoms, or hydroxyl.

Other and further objects, features and advantages of the present invention will appear more fully from the following description taken in connection with the accompanying drawings.

BRIEF DESCRIPTION OF THE DRAWINGS

FIG. 1 is a schematic illustration of typical ink jet recording head which the present invention relates to;

DESCRIPTION OF THE PREFERRED EMBODIMENTS

Figure 1:
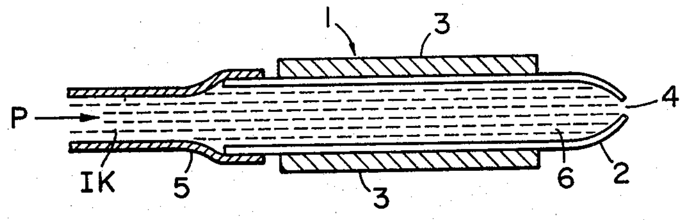

Since, as previously noted, the present invention is directed to a solution to the problems arising from the limited area around the orifice 4 (FIG. 1), preferred embodiments of the invention will be described in detail hereinafter showing the pertinent portion only, that is, a portion of recording head surrounding the jet orifice. However, it is to be understood that the present invention is never limited to recording heads of the type shown in FIG. 1 only and that the invention is applicable to any type of recording head provided that it is useful for jetting liquid from its orifice. In the recording head shown in FIG. 1, the jet orifice 4 is formed integrally with the conduit pipe 2 making use of the end portion of the pipe. However, as already mentioned in the above, a separate orifice plate having an opening of predetermined diameter can be used to form a jet orifice 4. In this case, the orifice plate is attached to the end of the conduit pipe 2. Obviously, the present invention is applicable also to such type of recording head in light of the following description.

Figure 2:
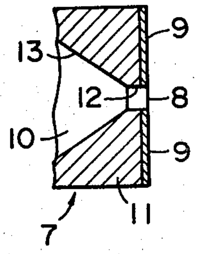
FIGS. 2, 3 and 4 are schematic and partly enlarged sectional views showing preferred embodiments of the invention respectively.

A first embodiment of the present invention schematically shown in FIG. 2.

In FIG. 2, the reference numeral 7 generally designates the orifice containing portion of a recording head in which a jet orifice 8 is formed. The jet orifice 8 constitutes the end of the orifice containing portion 7 and is in communication with an ink passage 10. Although not shown in the drawing, the ink passage 10 extends to an ink tank containing recording ink. Therefore, the passage 10 is normally filled with the recording ink. A member 11 forms at least a portion of the ink passage 10. In the shown embodiment, the outer wall surface of the orifice containing portion 7 is treated with a coating material at the surface portion surrounding the orifice 8. The coating material is repellent against the recording ink and forms a liquid repellent film layer 9 on the end surface of the member 11. The inner wall surfaces 12 and 13 of the member 11 by which the ink passage is formed are preferably lyophilic to the recording ink.

Figure 3:
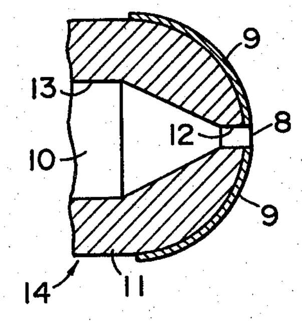

FIG. 3 shows a second embodiment of the invention in which the tip portion of a recording head is generally designated by 14.

The second embodiment is different from the above first embodiment shown in FIG. 2 in the point that the orifice containing portion, namely the tip portion 14 has a curved outer surface on which an ink repellent film layer 9 is provided. Thus, the curved surface area surrounding the orifice 8 is covered with the liquid repellent layer 9.

Figure 4:
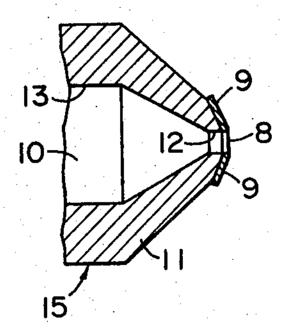

FIG. 4 shows a third embodiment of the invention in which the tip portion of a recording head is generally designated by 15. In this embodiment, the tip portion 15 has an outer surface which is not curved but tapered. A liquid repellent film layer 9 is applied on the area of the tapered surface surrounding the jet orifice 8.

Compared with the first embodiment, the second and third embodiments bring forth a further improvement in jet stability and droplet generating frequency owing to the curved or tapered outer surface of the orifice containing portion.

A further embodiment of the invention is described with reference to FIGS. 5A, 5B and 6.

Figure 5A:
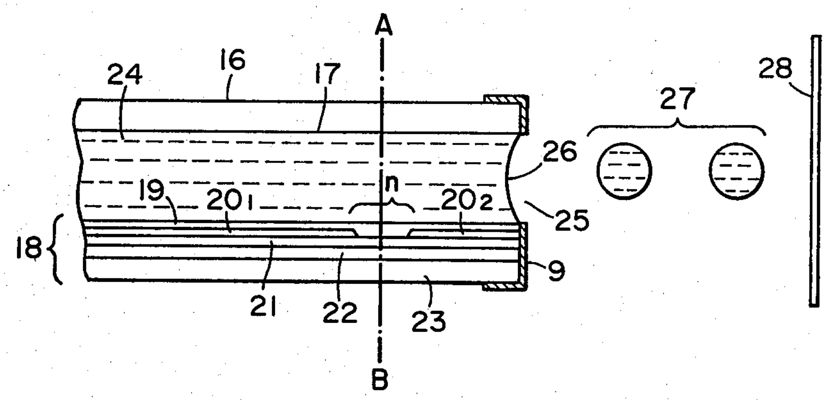
FIGS. 5A and 5B show the essential part of a recording head according to the invention is longitudinal section and in transverse section respectively.
Figure 5B:
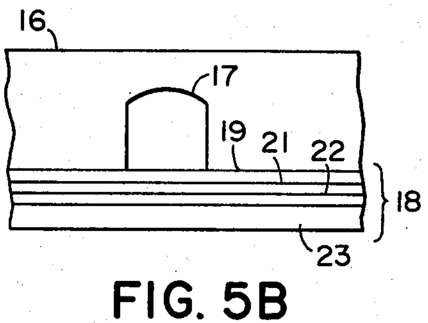

FIG. 5A shows the essential part of a thermal head 16. FIG. 5B is a cross-sectional view taken along the line A-B in FIG. 5A.

The recording head 16 comprises a body part formed of glass or ceramics and a heat generating head part 18 cemented together. The body part has an ink channel 17 formed therein for ink 24. The heat generating part 18 is of the type generally used in thermal recording (it is shown to be a lamination type but never limited thereto only). The heat generating head part 18 comprises a protecting layer 19, aluminum electrodes $\mathbf{20}_1$ and $\mathbf{20}_2$, a heat resistor layer 21, a heat accumulating layer 22 and a base plate 23. The protecting layer is formed of silicon oxide or the like. The heating resistor layer may be of nichrome. The base plate 23 is made of a material which is able to radiate head very well. For example, it is an alumina plate.

25 is a jet orifice at which the recording ink 24 forms a meniscus 26. A liquid repellent coating layer 9 is provided on the outer wall surface surrounding the jet orifice 25.

An electric signal is applied to the electrodes $20_1$ and $20_2$. At the time, the portion of the thermal head 18 indicated by n generates heat instantly and bubbles are generated in the recording ink 24 at the area in contact with the portion n. The pressure of the bubbles serves to push the meniscus 26 out. Thus, the recording ink 24 is jetted from the orifice 25 in a form of droplets 27 flying toward a recording material 28.

Figure 6:
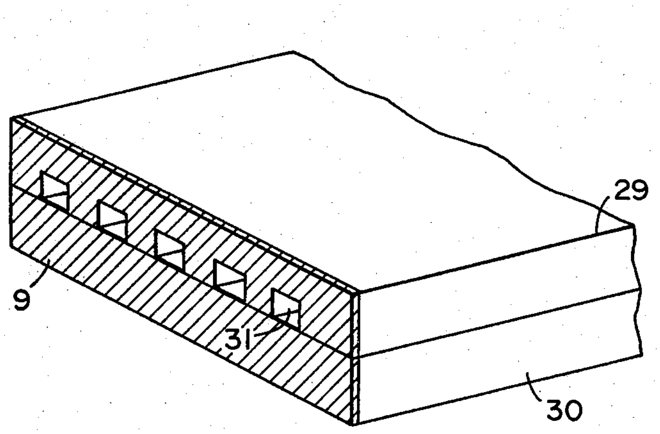
FIG. 6 is a perspective illustration of a multi-orifice type recording head according to the invention.

FIG. 6 shows a multi-orifice head formed by using a plural number of recording heads of the type shown in FIG. 5A and described above. The multi-orifice head is constituted of a glass plate 29 having a multi-channel 31 and a heat generating head part 30 having the same structure as that in FIG. 5A. The glass plate 29 and the heating head part 30 are cemented together. According to the feature of the present invention, a liquid repellent film layer 9 is provided on the outer wall surface of the end portion surrounding the jet orifices formed at the fore end of the multi-channel 31.

To form the above ink repellent layer, the recording head is treated with a particular treating agent. According to the invention there is used as the treating agent a compound of the following general formula (A)

$$R.Si.X_3 \quad (A)$$

wherein, R is a fluorine containing group selected from fluoroalkyl, fluoroaryl, fluorocycloalkyl, fluoroalkaryl and fluoroalkylaryl, each the fluorine containing group having 1 to 20 carbon atoms and in which the ratio in number of fluorines:other elements is not less than 1:1; X is halogen, a hydrolyzable group selected from alkoxy, alkyl and acyloxy, each having 1 to 5 carbon atoms, or hydroxyl group.

Preferred examples of the compound of the general formula (A) used in the invention include:

| | | |
|---|---|---|
| (1) | 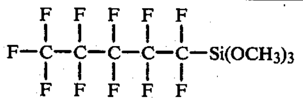 | undecafluoropentyl-trimethoxysilane |
| (2) | 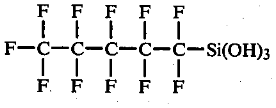 | nonafluorobutyl-trihydroxysilane |
| (3) | 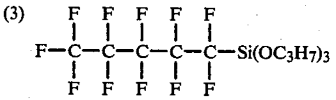 | undecafluoropentyl-tripropoxysilane |
| (4) | 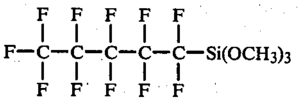 | tridecafluorohexyl-trimethoxysilane |
| (5) | 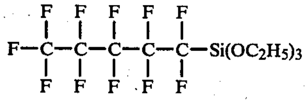 | undecafluoropentyl-triethoxysilane |
| (6) | 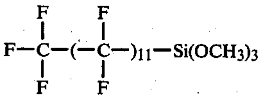 | perfluorododecyl-trimethoxysilane |
| (7) | $HCF_2.CF_2.Si\ Cl_3$ | 1,1,2,2-tetrafluorethyl-trichlorosilane |
| (8) | 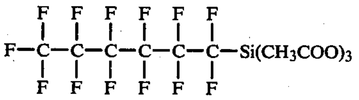 | tridecafluorohexyl-triacetoxysilane |
| (9) | 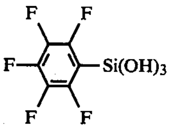 | pentafluorophenyl-trihydroxysilane |
| (10) | $CF_3.CFH.CF_2.Si\ Cl_3$ | 2-hydrohexafluoropropyl-trichlorosilane |
| (11) | $HCF_2.CF_2.Si(CH_3)Cl_2$ | 1,1,2,2-tetrafluoroethyl-methydichlorosilane |
| (12) | 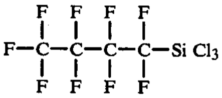 | 4-hydrooctafluorobutyl-trichlorosilane |

-continued

(13) 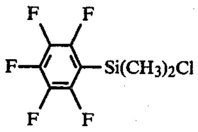 pentafluorophenyl-dimethylchlorosilane

(14) 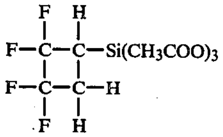 2,2,3,3-tetrafluorocyclobutyl-triacetoxysilane

(15) $(CF_3)_2CF—Si(OCH_3)_3$ heptafluoroisopropyl-trimethyoxysilane

(16) 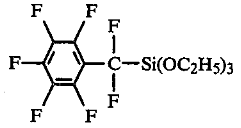 heptafluorobenzyl-triethoxysilane

(17) 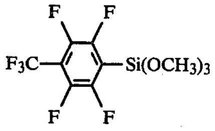 P—trifluoromethyl-tetrafluorophenyl-trimethoxysilane

(18) 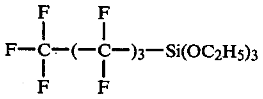 tridecafluorohexyl-triethoxysilane

Various treating methods may be used to treat the recording head with the compound according to the invention. For example, the recording heads of the present invention can be prepared by immersing preformed heads in a diluted or undiluted solution of the above repellent agent or coating the preformed heads with the agent employing other known techniques such as spray, vapour deposition and sputtering. Treatment may be carried out also at any suitable step of the manufacturing process of the recording head. In the former case wherein a preliminarily prepared head is subjected to the treatment according to the invention, it is advisable that the ink passage in the head be filled with some liquid (for example water) that is not miscible with the treating agent before treatment to prevent the treating agent from flowing into the inner wall surface of the ink passage.

When dried, the treating agent forms an ink repellent coating layer on the head surface. The coating layer of the treating agent according to the invention is preferably in the range of several 100 Å to several 10μ in dry thickness.

To further illustrate the invention, and not by way of limitation, the following examples are given.

EXAMPLE 1

At first, a thermal head member having the structure shown in FIG. 5A was prepared using an alumina plate of 1 mm thick as the base plate 23. The protecting layer 19 of 0.5 μm in thickness was formed by sputtering $SiO_2$. Electrodes $\mathbf{20}_1$, $\mathbf{20}_2$ were made of aluminum by employing vapour deposition technique and were 6000 Å in thickness. The heating resistor layer 21 was 600 Å in thickness which was formed by sputtering $ZrB_2$. The heat accumulating layer 22 was 4 μm in thickness which was formed by sputtering $SiO_2$.

The heating area (portion indicated by n in FIG. 5A) measured 200 μm×200 μm and the heating portions n were disposed at a pitch of 250 μm in conformity with the arrangement of a multi-orifice head later formed. In a glass plate of 1.3 mm in thickness there were formed ink channels 17 by cutting the glass plate with a diamond cutter. The channel 17 measured 200 μm in width and 200 μm in depth.

The thermal head member and the glass plate thus prepared were cemented together to form a multi-orifice head as shown in FIG. 6. The pitch between ink channels was 250 μm. The outer wall surface containing the jet orifices of the multi-orifice head was polished, washed well with distilled water and dried. After all of the ink channels being filled with mercury, the polished surface was treated with a treating agent according to the invention to make the surface repellent against recording ink.

As the treating agent, 1% solution of undecafluoropentyltrimethoxysilane in trichlorofluoroethane was used. The surface containing the jet orifices of the head was immersed into the solution. After drawing it up from the treatment bath, the surface was dried by a blast of hot air from a drier (dry film thickness: 1μ).

A recording ink composition was prepared with the composition below given and filtered. The multi-orifice head prepared above was charged with the ink composition to conduct an ink jet test.

Under the conditions below given, electric signals were continuously applied to the multi-orifice head. In response to the signals the head continued jetting ink droplets in a very stable manner for about 100 hours. After stopping the application of electric signal, the head was left standing for 10 months. Thereafter, signals were again applied to the head. The head responded to the signal instantly and correctly and the head restarted jetting ink droplets without any trouble.

For the sake of comparison, a control head was prepared in the same manner as above with the exception of repellency treatment. Namely, no ink repellency treatment was carried out for the control head. The head was brought into operation under the same conditions as in the above. Several minutes after the start of operation, a splash phenomenon took place and it was no longer possible to obtain satisfactory prints from the control head.

| Ink Composition (A) | (part by weight) |
|---|---|
| Black dye, SOLBEN BLACK PUL (Orient Chemicals Co. Ltd) | 10 |
| Ethyl alcohol | 80 |
| Ethylene glycol | 10 |
| Electric Signal Conditions | |
| Pulse width of pulses applied | 10 μsec. |
| Frequency | 10 KHZ |
| Pulse voltage (per one heating element) | 30 V |

EXAMPLE 2-15

According to the procedure described in EXAMPLE 1, recording heads were prepared using various ink repellent treating agents shown in the following table in place of that used in EXAMPLE 1. For these recording heads, ink jet tests were conducted in the same manner as in EXAMPLE 1. Good results comparable to that in EXAMPLE 1 were obtained for every recording head.

| | Treating agent | | |
|---|---|---|---|
| Example No. | General formula (A) compound No. | Concentration | Dry film thickness |
| 2 | (4) | 1% | 0.8μ |
| 3 | (5) | " | 1μ |
| 4 | (6) | " | 1.2μ |
| 5 | (7) | 2% | 2μ |
| 6 | (10) | " | 2.5μ |
| 7 | (11) | " | 1.8μ |
| 8 | (12) | 5% | 12μ |
| 9 | (13) | 2% | 2.5μ |
| 10 | (14) | 1% | 1.5μ |
| 11 | (15) | 3% | 4μ |
| 12 | (16) | " | 6μ |
| 13 | (17) | 1% | 2μ |
| 14 | (18) | " | 1μ |
| 15 | (2) | 2% | 1.5μ |

EXAMPLE 16

For the recording heads in EXAMPLES 2-15, ink jet tests were repeated substituting the following ink compositions (B), (C) and (D) for the above ink composition (A). Good results comparable to that in EXAMPLE 1 were obtained in every case.

| | part by weight |
|---|---|
| Ink Composition (B) | |
| Black dye; KAYAKU FAST BLACK D (Nihon Kayaku Co. Ltd) | 5 |
| Water | 85 |
| Ethylene glycol | 10 |
| Ink Composition (C) | |
| Black dye; SPILON BLACK GMH (Hodogaya Chemicals Co. Ltd) | 5 |
| Triethylene glycol monomethyl ether | 65 |
| Polyethylene glycol #200 (Nihon Oil and Fat Co. Ltd) | 30 |
| Ink Composition (D) | |
| Black dye; OIL BLACK HBB (Orient Chemicals Co. Ltd) | 10 |
| Cyclohexane | 20 |
| Isopropylnaphthalene | 70 |

As readily understood from the foregoing, the present invention has remarkable effects on improvement in stability of operation of ink jet recording head. According to the invention, the outer surface of the recording head is treated with a compound particularly selected by the invention at the surface area surrounding the jet orifice. By this treatment, the surface is made repellent against the recording ink no matter whether the ink is of aqueous system or non-aqueous system. Therefore, a stable recording operation is always assured in ink jet recording. Moreover, with the recording head of the invention a great extent of reduction in energy required for ink jet can be attained and therefore a further speed-up of recording is made possible according to the invention. Since the recording head of the invention can jet ink droplets in a very stable manner without any trouble of splashing, high quality of record without fogging are always obtained in ink jet recording.

While the invention has been particularly shown and described with reference to preferred embodiments thereof, it will be understood by those skilled in the art that the foregoing and other changes in form and details can be made therein without departing from the spirit and scope of the invention.

What we claim is:

1. An ink jet recording head of the type in which ink droplets are jetted from the jet orifice of the head toward a recording material to effect recording on the surface of the recording material with said ink droplets, with said recording head in at least the area surrounding the jet orifice treated with a compound of general formula:

$$R.Si.X_3$$

wherein, R is a fluorine containing group selected from fluoroalkyl, fluoroaryl, fluorocycloalkyl, fluoroalkaryl and fluoroalkylaryl, each having 1 to 20 carbon atoms, and the ratio in number of fluorines:other elements in said fluorine containing group being not less than 1:1; and X is halogen, a hydrolyzable group selected from alkoxy, alkyl and acyloxy each having 1 to 5 carbon atoms, or hydroxyl.

2. An ink jet recording head according to claim 1 wherein the compound of general formula $R.Si.X_3$ is at least one compound selected from undecafluoropentyltrimethoxysilane, nonafluorobutyltrihydroxysilane, undecafluoropentyltripropoxysilane, tridecafluorohexyltrimethoxysilane, undecafluoropentyltriethoxysilane, perfluorododecyltrimethoxysilane, 1,1,2,2-tetrafluoroethyltrichlorosilane, tridecafluorohexyltriacetoxysilane, pentafluorophenyltrihydroxysilane, 2-hydrohexafluoropropyltrichlorosilane, 1,1,2,2-tetrafluoroethylmethyldichlorosilane, 4-hydrooctafluorobutyltrichlorosilane, pentafluorophenyldimethylchlorosilane, 2,2,3,3-tetrafluorocyclobutyltriacetoxysilane, heptafluoroisopropyltrimethoxysilane, heptafluorobenzyltriethoxysilane, p-trifluoromethyltetrafluorophenyltrimethoxysilane and tridecafluorohexyltriethoxysilane.

3. An ink jet recording head according to claim 1 wherein said compound of the general formula $R.Si.X_3$ forms a coating film layer on said head surface.

4. An ink jet recording head according to claim 3 wherein said coating layer has a film thickness in the range of from several 100 Å to several 10μ.

5. An ink jet recording head according to claim 3 wherein said treated surface of the recording head is composed of glass, ceramics or metal.

* * * * *